United States Patent
Mandal et al.

(10) Patent No.: US 11,753,507 B2
(45) Date of Patent: *Sep. 12, 2023

(54) ADDITION CURABLE COMPOSITION COMPRISING SILOXANE-IMIDE COPOLYMERS

(71) Applicant: Momentive Performance Materials Inc., Waterford, NY (US)

(72) Inventors: Subrata Mandal, Bangalore (IN); Tetsuo Fujimoto, Gunma (JP); Vinodh Rajendra, Ballston Spa, NY (US); Joseph Zampella, Niskayuna, NY (US); Ramasubramanian Narayanan, Bangalore (IN); Clarissa Miller, Waterford, NY (US)

(73) Assignee: Momentive Performance Materials Inc., Waterford, NY (US)

(*) Notice: Subject to any disclaimer, the term of this patent is extended or adjusted under 35 U.S.C. 154(b) by 138 days.

This patent is subject to a terminal disclaimer.

(21) Appl. No.: 17/132,234

(22) Filed: Dec. 23, 2020

(65) Prior Publication Data
US 2022/0195124 A1   Jun. 23, 2022

(51) Int. Cl.
| | |
|---|---|
| C08L 83/04 | (2006.01) |
| C08G 77/455 | (2006.01) |
| C08G 77/08 | (2006.01) |
| C08G 77/12 | (2006.01) |
| C08G 77/20 | (2006.01) |
| C08G 77/00 | (2006.01) |
| C08K 3/22 | (2006.01) |
| C08K 5/3417 | (2006.01) |
| C08L 83/08 | (2006.01) |

(52) U.S. Cl.
CPC .......... *C08G 77/455* (2013.01); *C08G 77/08* (2013.01); *C08G 77/12* (2013.01); *C08G 77/20* (2013.01); *C08G 77/70* (2013.01); *C08G 77/80* (2013.01); *C08K 3/22* (2013.01); *C08K 5/3417* (2013.01); *C08L 83/08* (2013.01); C08K 2003/2272 (2013.01); C08L 2201/08 (2013.01); C08L 2203/20 (2013.01); C08L 2205/03 (2013.01); C08L 2312/08 (2013.01)

(58) Field of Classification Search
CPC .............................. C08L 83/08; C08G 77/455
USPC ....................................................... 528/15, 31
See application file for complete search history.

(56) References Cited

U.S. PATENT DOCUMENTS

| | | | | |
|---|---|---|---|---|
| 3,975,362 | A | * | 8/1976 | Kim ...................... C08G 77/20 528/42 |
| 4,634,610 | A | | 1/1987 | Keohan et al. |
| 4,810,728 | A | * | 3/1989 | Gross ..................... C08J 9/0061 521/154 |
| 5,009,934 | A | | 4/1991 | Wenski et al. |
| 5,429,872 | A | * | 7/1995 | Nakamura ............. G03G 15/65 428/447 |
| 6,451,381 | B2 | | 9/2002 | Nakamura et al. |
| 8,071,693 | B2 | | 12/2011 | Banerjee et al. |
| 2003/0004268 | A1 | | 1/2003 | Sundararaj et al. |

FOREIGN PATENT DOCUMENTS

| | | |
|---|---|---|
| GB | 2143246 | 7/1987 |
| JP | 03097849 | 10/1991 |
| JP | 4803371 | 10/2011 |
| KR | 1020140073363 | 6/2014 |

OTHER PUBLICATIONS

Orzeszko et al., "Synthesis of novel silicon-modified polymides." Polymer Bulletin. vol. 48, 2002, pp. 431-438.
Siltem Resin—An Introduction, Chemistry that Matters. https://www.sabic.com/en/products/specialties/siltem-resins.
Patent Cooperation Treaty (PCT), International Search Report and Written Opinion for Application PCT/US2021/060418 filed Nov. 23, 2021, dated Mar. 10, 2022, International Searching Authority, EP.

* cited by examiner

*Primary Examiner* — Margaret G Moore
(74) *Attorney, Agent, or Firm* — Joseph Waters; McDonald Hopkins LLC

(57) ABSTRACT

A curable silicone adhesive composition comprising a heat stable siloxane-imide copolymer is shown and described herein. The composition includes an alkenyl silicone, a silicone hydride based cross linker, hydrosilylation catalyst and additives that is curable at relatively low temperatures and shows good heat stability.

35 Claims, No Drawings

ADDITION CURABLE COMPOSITION COMPRISING SILOXANE-IMIDE COPOLYMERS

FIELD OF INVENTION

The present invention relates to an addition curable composition. In particular, the present invention relates to an addition curable composition comprising an olefin terminated siloxane-imide copolymer, a Si—H based crosslinker, a catalyst and optionally other additives to provide a heat stable material that is stable at high temperatures, (e.g., greater than 350° C.). The curable material can be employed in a variety of applications including those where there may be exposure to high temperatures or even extreme changes in temperature.

BACKGROUND

High heat stable materials, e.g., materials that are stable at temperatures of about 350° C. or greater, are desirable for a wide range of applications. Additionally, many applications not only require stability at high temperatures, but the material may require to retain or substantially sustain its mechanical properties and flexibility over a wide range of temperatures from extreme cold (e.g., below 0° C. to −100° C.) to high heat exposure (e.g., about 350° C. or greater). Many current curable silicone-based materials are generally stable up to 275° C. only. Organic polymers like polyimide and polybenzimidazole can be stable at more than 400° C., but these materials have their own processability and flexibility issues, which makes them difficult to use for some applications. Considering their characteristic individual limitations (heat stability and flexibility), pure silicone or pure organic polymer like polyimide cannot be used alone for this wide temperature application.

Siloxane modified polyimide materials are known in art. These materials are self-standing membrane type flexible materials with high heat stability and high thermal conductive properties. These materials, however, have some processability issues that limit their ability to be used in large-scale applications.

Recent attempts to improve heat stability have included the use of a mold making composition comprising copolymer of siloxane modified polyimide or siloxane-polyetherimide block copolymer (see, e.g., U.S. Pat. No. 8,071,693, U.S. Publication 2003/0004268, and U.S. Pat. No. 6,451,381). Other attempts are described in, for example, Japan Patents 3279635 and 4803371 related to non-curable siloxane imide copolymers and Korean publication 10-2014-007363 related to a composite sheet comprising a siloxane imide copolymer with reinforcing material. These proposed solutions, however, do not address the high heat stable material more than 350° C.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, provided is an addition curable silicone-imide copolymer composition. The additional curable silicone-imide copolymer compositions have been found to cure at low temperature, without the presence of any solvent.

In another aspect, provided is a cured material formed from the addition curable composition that shows heat stability superior to that of pure siloxane. The cured material can be employed provided in a variety of forms, e.g., as an adhesive, as a sealing adhesive or gap filler, as a coating, or to form a shaped material. The cured material has been found to maintain good mechanical and other characteristic properties when exposed to extreme cold or to extreme heat and can remain flexible in nature.

In one aspect, provided is an addition curable silicone composition comprising:
(A) an alkenyl functional siloxane-imide copolymer;
(B) 0 to about 80 parts by mass of an alkenyl functional organosiloxane;
(C) an polyorganohydrogensiloxane having at least two hydrogen atoms bonded to silicon atoms;
(D) a catalyst;
(E) an additive; and
(F) 0 parts by mass to about 3000 parts of a filler based on the total weight of the curable silicone composition.

In one embodiment, the siloxane-imide copolymer (A) is selected from a compound of the formula (I):

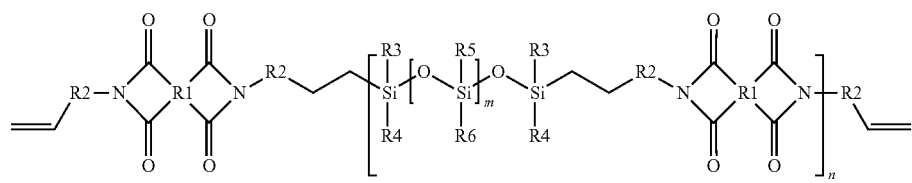

(I)

where $R^1$ is independently chosen from a C5-C20 aryl, a polycyclic aryl group comprising two or more C5-C20 aryl groups, where $R^1$ can be unsubstituted or substituted with a C1-C6 alkyl, a halogen, a haloalkyl, a hydroxy, and/or a C1-C5 alkoxy groups;
$R^2$ is independently selected from a C1-C20 divalent hydrocarbon, a C4-C20 branched divalent hydrocarbon, or a C4-C30 cyclic containing hydrocarbon group;
$R^3$, $R^4$, $R^5$, and $R^6$ are each independently selected from a C1-C10 alkyl and a C6-C20 aryl;
m is an integer from 1 to about 200; and
n is an integer from 1 to about 30.

In one embodiment, $R^1$ is independently selected from benzene, naphthalene, benzophenone, biphenyl, a biphenyl alkane, biphenylether, isopropylidinephenylphenoxy, biphenyl sulfone, biphenyl sulfide, norbornyl, or hexafluoromethylbiphenyl. In one embodiment, each $R^1$ is benzene.

In one embodiment, siloxane-imide copolymer (A) is present in an amount of from about 10 parts by mass to about 100 parts, more preferably from about 20 parts to about 98 parts, and most preferably from about 30 parts to about 95 parts based on total weight of the curable silicone-imide composition.

In one embodiment, the polyorganosiloxane (B) is chosen from a compound of the formula $M^1_a M^2_b D^1_c D^2_d T^1_e T^2_f Q_g$ wherein:

$M^1 = R^7 R^8 R^9 SiO_{1/2}$
$M^2 = R^{10} R^{11} R^{12} SiO_{1/2}$
$D^1 = R^{13} R^{14} SiO_{2/2}$
$D^2 = R^{15} R^{16} SiO_{2/2}$
$T^1 = R^{17} SiO_{3/2}$
$T^2 = R^{18} SiO_{3/2}$
$Q = SiO_{4/2}$ where $R^7$, $R^8$, $R^9$, $R^{10}$, $R^{11}$, $R^{12}$, $R^{13}$, $R^{14}$, $R^{16}$, and $R^{17}$ are independently chosen from a C1-C30 hydrocarbon, or a C6-C30 aromatic group;

$R^{10}$, $R^{15}$ and $R^{18}$ are independently chosen from a C1-C30 hydrocarbon, a C6-C30 aromatic group, C1-C30 alkoxy group, or a C2-C30 alkenyl group, with the proviso that one or more of $R^{10}$, $R^{15}$, and/or $R^{18}$ are selected from a C2-C30 alkenyl group; and the subscripts a, b, c, d, e, f, g, are zero or positive subject to the following limitations: 2<a+b+c+d+e+f+g<2000, b+d+f>0.

In one embodiment, $R^7$, $R^8$, $R^9$, $R^{10}$, $R^{11}$, $R^{12}$, $R^{13}$, $R^{14}$, $R^{16}$, and $R^{17}$ are independently chosen from a C1-C30 hydrocarbon, or a C6-C30 aromatic group, where at least one of $R^7$, $R^8$, $R^9$, $R^{10}$, $R^{11}$, $R^{12}$, $R^{13}$, $R^{14}$, $R^{16}$, and $R^{17}$ is selected from a C6-C30 aromatic group.

In one embodiment, at least one of $R^{13}$ and/or $R^{14}$ is a C6-C30 aromatic group.

In one embodiment, $R^{13}$ and/or $R^{14}$ are a phenyl group.

In one embodiment, the component (B) is present in an amount of from about 0 parts by mass to about 80 parts, more preferably from about 0 parts to about 60 parts, and most preferably from about 0 parts to about 50 parts based on the total weight of the curable silicone composition. In one embodiment, the alkenyl functional organosiloxane (B) in an amount of from about 10 parts by mass to about 50 parts based on the total weight of the curable silicone composition.

In one embodiment, the alkenyl functional siloxane-imide copolymer (A) is present in an amount of from about 20 to about 50 parts by mass based on the total weight of the curable silicone composition, and the alkenyl functional organosiloxane (B) is present in an amount of from about 20 parts to about 50 parts by mass based on total weight of the curable silicone-imide composition.

In one embodiment, the alkenyl functional siloxane-imide copolymer (A) is present in an amount of from about 30 parts to about 40 parts by mass based on total weight of the curable silicone-imide composition, and the alkenyl functional organosiloxane (B) is present in an amount of 30 parts to about 40 parts by mass based on total weight of the curable silicone-imide composition.

In one embodiment the polyorganohydrogensiloxane component (C) is chosen from a compound of the formula: $M^3_h M^4_i D^3_j D^4_k T^3_m T^4_n Q_o$ wherein:

$M^3 = R^{19} R^{20} R^{21} SiO_{1/2}$
$M^4 = R^{22} R^{23} R^{24} SiO_{1/2}$
$D^3 = R^{25} R^{26} SiO_{2/2}$
$D^5 = R^{27} R^{28} SiO_{2/2}$
$T^3 = R^{29} SiO_{3/2}$
$T^4 = R^{30} SiO_{3/2}$
$Q = SiO_{4/2}$ where $R^{19}$, $R^{20}$, $R^{21}$, $R^{25}$, $R^{26}$, and $R^{29}$, and are independently chosen from a C1-C30 hydrocarbon, a C6-C30 aromatic group, or C1-C30 alkoxy group;

$R^{22}$, $R^{23}$, $R^{24}$, $R^{27}$, $R^{28}$, and $R^{30}$ are independently chosen from hydrogen, a C1-C30 hydrocarbon, a C6-C30 aromatic group, C1-C30 alkoxy group, or a C2-C30 alkenyl group, with the proviso that one or more of $R^{22}$, $R^{23}$, $R^{24}$, $R^{27}$, $R^{28}$, and/or $R^{30}$ are hydrogen; and the subscripts h, i, j, k, m, n, o are zero or positive subject to the following limitations: 1<h+i+j+k+m+n+o<100, i+k+n>0.

In one embodiment, the polyorganohydrogensiloxane component (C) is present in an amount of from about 0.05 parts by mass to about 10 parts, more preferably from about 0.08 parts to about 6 parts, and most preferably from about 1 parts to about 4 parts based on the total weight of the curable composition.

In one embodiment, the catalyst (D) is selected from precious metal catalysts selected from ruthenium, rhodium, palladium, osmium, iridium, and platinum, and complexes comprising these metals.

In one embodiment, the catalyst (D) is present in an amount of from about 1 parts by mass to about 10 parts, more preferably from about 2 parts to about 8 parts, and most preferably from about 3 parts to about 6 parts based on the total weight of the curable silicone composition.

In one embodiment, the additive (E) is selected from at least one of a pigment, a lubricant, a viscosity modifier, a heat stabilizer, a photostabilizer, a flame retardant, an inhibitor, an adhesion promoter, or combinations of two or more thereof.

In one embodiment, the additive (E) is present in an amount of from about 0.05 parts by mass to about 3000 parts, more preferably from about 15 parts to about 1000 parts, and most preferably from about 0.05 parts to about 1 part based on the total weight of the curable silicone composition.

In one embodiment, the additive (E) is an inhibitor.

In one embodiment, the inhibitor is present in an amount of from about 1 part by mass to about 10 parts, more preferably from about 0.1 parts to about 2 parts, and most preferably from about 0.05 parts to about 1 part based on the total weight of the curable silicone-imide composition. In one embodiment, the inhibitor is present in an amount of from about 0.05 parts by mass to about 10 parts based on the total weight of the curable silicone-imide composition. In one embodiment, the inhibitor is present in an amount of from about 0.05 parts by mass to about 2 parts based on the total weight of the curable silicone-imide composition.

In one embodiment, the inhibitor is selected from an ethylenically unsaturated amide, aromatically unsaturated amide, an acetylenic compound, an ethylenically unsaturated isocyanate, an olefinic siloxane, an unsaturated hydrocarbon diester, an unsaturated hydrocarbon mono-ester of unsaturated acid, a conjugated or isolated ene-yne, a hydroperoxide, a ketone, a sulfoxide, an amine, a phosphine, a phosphite, a nitrite, a diaziridine, or a combination of two or more thereof.

In one embodiment, the inhibitor is selected from an alkynyl alcohol, a maleate, or combination thereof.

In one embodiment, the inhibitor is selected from diallyl maleate, hydroquinone, p-methoxyphenol, t-butylcatechol, phenothiazine, or a combination of two or more thereof.

In one embodiment, the filler (F) is selected from Silica, fumed Silica, $TiO_2$, MgO, ZnO, $CaCO_3$, $CeO_2$, $Fe_2O_3$, SiC, clay material, Graphene Oxide, Boron Oxide, BN, Carbon Nano Tube, Zirconium Oxide, Fly Ash, $Zr(OEt)_4$, $Ti(OEt)_4$, powder form of any polyimide, polybenzimidazole, polyamideimide, poly BPA sulfone, Siloxane-polyimide, Siloxane-benzimidazole, Siloxane-polysulfones or any other heat stable filler.

In one embodiment, the filler (F) is present in an amount of from about 0 parts by mass to about 3000 parts, more preferably from about 15 parts to about 2000 parts, and most preferably from about 25 parts to about 30 parts based on the total weight of the curable silicone composition.

In one embodiment, the filler (F) is present in an amount of from about 20 parts by mass to about 30 parts based on the total weight of the curable silicone composition.

In one embodiment, the filler is $Fe_2O_3$

In one embodiment, the silicone-imide composition is coated or adhered on a substrate.

In one embodiment, the substrate is chosen from the substrate comprises a material selected from a plastic material, a ceramic, a glass, a rubber material, a filled metal, a metal alloy, a metallized plastic, a coated or painted metal, or a combination of two or more thereof.

In one embodiment, the substrate material is selected from an acrylic polymer, a polyester, a polyamide, a polyimide, an acrylonitrile-styrene copolymer, a styrene-acrylonitrile-butadiene terpolymer, polyvinyl chloride, polyethylene, polycarbonate, a copolycarbonate, or a combination of two or more thereof.

In still another aspect, provided is a process of preparing a cured silicone-imide material comprising contacting the composition of any of the previous embodiments with a curing condition. In one embodiment, the curing condition is a curing catalyst.

In another aspect, provided is a cured silicone-imide material formed from the composition of any of the previous aspects and embodiments.

In one embodiment, the cured silicone imide material has a thermal degradation of 300° C. to 600° C. as measured by thermogravimetric analysis.

In one embodiment, the cured silicone-imide material is employed on or as part of an article in an aerospace device, an electronic device, an electronic component, an automobile, insulation, a coating, or a solvent resistant membrane.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The disclosure may identify a number of different ranges for a component or components in the composition. It will be appreciated that the numerical values of the respective ranges can be combined to form new and non-specified ranges.

The term "alkyl" includes straight, branched, and cyclic monovalent hydrocarbon groups, which may be substituted with a heteroatom or heteroatom containing group. In embodiments, the term alkyl may include C1-C30 alkyl groups. Examples of suitable alkyl groups include, but are not limited to, methyl, ethyl, propyl, isopropyl, butyl, isobutyl, tertbutyl, pentyl, hexyl, heptyl, octyl, nonyl, decyl, etc.

The term "alkylene" includes straight, branched, and cyclic divalent hydrocarbon groups, which may be substituted with a heteroatom or heteroatom containing group. In embodiments, the term alkylene includes C1-C30 alkylene groups. Examples of alkylenes include, but are not limited to, methylene, ethylene, propylene, isopropylene, butylene, isobutylene, tertbutylene, pentylene, hexylene, heptylene, octylene, nonylene, decylene, etc.

The term "aryl" includes any monovalent aromatic hydrocarbon group, which may be substituted with a heteroatom or heteroatom containing group. This term also includes fused systems containing an aromatic group and groups with multiple aryl groups joined by a bond or linker group. In embodiments, the term aryl include C5-C20 aryl groups, fused aryl groups comprising two or more C5-C20 aryl groups, and multi-aryl group structures comprising two or more C5-C20 aryl groups joined by a linker group.

The term "arylene" includes any divalent aromatic hydrocarbon group, which may be substituted with a heteroatom or heteroatom containing group this term also includes fused systems containing an aromatic group. In embodiments, the term aryl include C5-C20 arylene groups, fused arylene groups comprising two or more C5-C20 aryl groups, and multi-arylene group structures comprising two or more C5-C20 aryl groups joined by a linker group.

The term "aralkyl" include straight, branched, and cyclic monovalent hydrocarbon groups substituted with an aryl substituent.

The term "cyclo" or "cyclic" alkyl includes a monovalent cyclic hydrocarbon and includes, free cyclic groups, bicyclic groups, tricyclic groups, and higher cyclic structures, as well as bridged cyclic groups, fused cyclic groups, and fused cyclic groups containing at least one bridged cyclic group. In embodiments, a cyclic alkyl includes a C3-C20 cyclic alkyl group. Example of suitable cyclic groups include, but are not limited to, cyclopropyl, cyclopentyl, cyclohexyl, norbornyl, bicyclo[2.2.2]nonane, adamantyl, or tetrahydronaphthyl (tetralin).

The term "cyclo" or "cyclic" alkylene includes a divalent cyclic hydrocarbon and includes, free cyclic groups, bicyclic groups, tricyclic groups, and higher cyclic structures, as well as bridged cyclic groups, fused cyclic groups, and fused cyclic groups containing at least one bridged cyclic group. In embodiments, a cyclic alkylene includes a C3-C20 cyclic alkylene group.

The term "alkynyl" is defined as a $C_{2-10}$ branched or straight-chain unsaturated aliphatic hydrocarbon groups having one or more triple bonds between two or more carbon atoms. Examples of alkynes include ethynyl, propynyl, butynyl, pentynyl, hexynyl, heptynyl, octynyl and nonynyl.

The term "substituted" means that one or more hydrogens on the molecule, portion of the molecule, or atom are replaced by a substitution group provided that the normal valency is not exceeded. The substitution group can be a heteroatom. The term "hetero" as used refer to an atom or in conjunction with another group includes an atom or group containing an atom such as oxygen, nitrogen, sulfur, silicon, phosphorus, boron, etc. Examples of suitable substitution groups include, but are not limited to, —OR, —NR'R, —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., ↑O) group, then 2 hydrogens on the atom are replaced. Keto substituents are not present on aromatic moieties. The terms R and R' refer to alkyl groups that may be the same or different.

Provided is an addition curable silicone-imide copolymer composition. The composition may be employed to form an adhesive material when cured. The composition has been found to cure at low temperatures (e.g., from room temperature, e.g., about 20-25° C., to 150° C.) without the presence of any solvent. Also provided is a cured material comprising or formed from the composition. Cured materials formed from the present compositions exhibit excellent properties including being heat stable at relatively high temperatures (e.g., about 350° C. or greater) as well as heat stability upon exposure to extreme changes in temperature including from very cold temperatures to very high temperatures. In embodiments, cured materials formed from the present compositions exhibit a decomposition peak ($T_d$) which is superior to that of pure siloxane.

In one embodiment, an addition curable silicone composition comprises:
(A) an alkenyl functional siloxane-imide;
(B) 0 to 80 parts by mass of an alkenyl functional organosiloxane;
(C) a polyorganohydrogensiloxane having at least two hydrogen atoms bonded to silicon atoms in one molecule; the polyorganohydrogensiloxane can be provided in amount such that an amount of the hydrogen atoms bonded to silicon atoms is 0.9 to 10 mol relative to 1 mol of a total amount of the alkenyl groups contained in the (A) component;
(D) a catalyst amount of a hydrosilylation reaction catalyst;
(E) an additive; and
(F) a filler.

In one embodiment, the siloxane-imide copolymer (A) is selected from a compound of the formula (I):

where:
$R^1$ is chosen from a C5-C20 aryl, a polycyclic aryl group comprising two or more C5-C20 aryl groups, where $R^1$ can be unsubstituted or substituted with a C1-C6 alkyl, a halogen, a haloalkyl, a hydroxy, and/or a C1-C5 alkoxy groups;
$R^2$ is independently selected from a C1-C20 divalent hydrocarbon, a C4-C20 branched divalent hydrocarbon, or a C4-C30 cyclic containing hydrocarbon group;
$R^3$, $R^4$, $R^5$, and $R^6$ are each independently selected from a C1-C10 alkyl and a C6-C20 aryl;
m is an integer from 1 to about 200; and
n is an integer from 1 to about 30.

$R^1$ is independently selected from a C5-C20 aryl, or polycyclic aryl comprising two or more C5-C20 aryl groups. The polycyclic aryl groups can be a fused ring or an unfused system joined by a linker group. Examples of suitable aryl and/or polycyclic aryl groups for R1 include, but are not limited to, benzene, naphthalene, benzophenone, biphenyl, a biphenyl alkane (e.g., a biphenyl group with an alkyl linker chosen from a C1-C20 alkyl such as, but not limited to, biphenyl methane, biphenyl ethane, biphenyl propane, biphenyl isopropane, biphenyl butane, biphenyl isobutene, biphenyl tert-butane, biphenyl hexane, biphenyl octane, etc.) biphenylether, isopropylidinediphenylphenoxy, biphenyl sulfone, biphenyl sulfide, norbornyl and hexafluoromethyl-biphenyl, etc. In one embodiment, $R^1$ is benzene.

$R^2$ is selected from a C1-C20 divalent hydrocarbon, a C4-C20 branched divalent hydrocarbon, or a C4-C30 cyclic containing hydrocarbon group. In embodiments, $R^2$ is selected from a C1-C20 divalent hydrocarbon, a C2-C15 hydrocarbon, a C3-C10 divalent hydrocarbon, or a C4-C6 divalent hydrocarbon. In one embodiment, $R^2$ is a C1 divalent hydrocarbon (i.e., and methylene group).

$R^3$, $R^4$, $R^5$, and $R^6$ are each independently selected from a C1-C10 alkyl and a C6-C20 aryl. In embodiments, $R^3$, $R^4$, $R^5$, and $R^6$ are selected from a C1-C10 alkyl, a C2-C8 alkyl, or a C4-C6 alkyl. In one embodiment, $R^3$, $R^4$, $R^5$, and $R^6$ are each methyl.

In one embodiment, m is an integer of from 1 to about 200, from about 5 to about 175, from about 10 to about 150, from about 25 to about 135, from about 50 to about 110, or from about 75 to about 100.

In one embodiment, n is an integer of from about 1 to about 30, from about 2 to about 25, from about 5 to about 20, or from about 10 to about 15.

The siloxane-imide copolymer can be prepared by methods known to those skilled in the art. In one embodiment, the siloxane-imide copolymer can be prepared by the reaction of an allyl imide of the formula (i-a) with an organohydrogensiloxane (i-b):

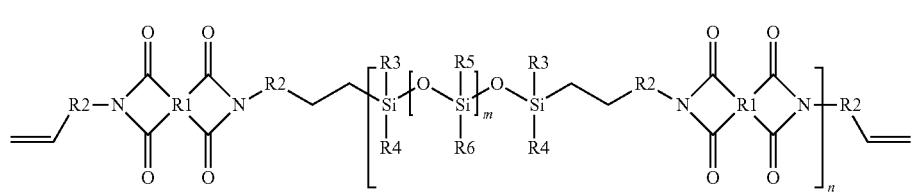

(I)

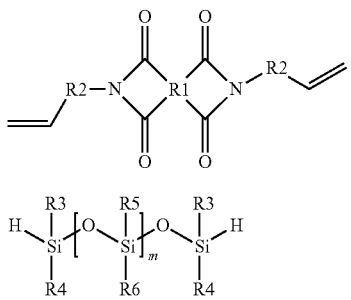

(i-a)

(i-b)

where m, $R^1$, $R^2$, $R^3$, $R^4$, $R^5$, and $R^6$ are as described above.

The siloxane-imide copolymer (A) can be present in an amount of from 10 parts by mass to about 100 parts, from about 20 parts to about 98 parts, or from about 30 parts to about 95 parts based on total weight of the curable silicone-imide composition. In one embodiment, the siloxane-imide copolymer (A) is present in an amount of from about 20 parts to about 50 parts based on total weight of the curable silicone-imide composition, from about 25 parts to about 45 parts based on total weight of the curable silicone-imide composition, or from about 30 parts to about 40 parts based on total weight of the curable silicone-imide composition.

In one embodiment, the polyorganosiloxane (B) is chosen from a compound of the formula the formula $M^1{}_aM^2{}_bD^1{}_cD^2{}_dT^1{}_eT^2{}_fQ_g$ wherein:

$M^1=R^7R^8R^9SiO_{1/2}$
$M^2=R^{10}R^{11}R^{12}SiO_{1/2}$
$D^1=R^{13}R^{14}SiO_{2/2}$
$D^2=R^{15}R^{16}SiO_{2/2}$
$T^1=R^{17}SiO_{3/2}$
$T^2=R^{18}SiO_{3/2}$
$Q=SiO_{4/2}$ where $R^7$, $R^8$, $R^9$, $R^{10}$, $R^{11}$, $R^{12}$, $R^{13}$, $R^{14}$, $R^{16}$, and $R^{17}$ are independently chosen from a C1-C30 hydrocarbon, or a C6-C30 aromatic group;

$R^{10}$, $R^{15}$, and $R^{18}$ are independently chosen from a C1-C30 hydrocarbon, a C6-C30 aromatic group, C1-C30 alkoxy group, or a C2-C30 alkenyl group, with the proviso that one or more of $R^{10}$, $R^{15}$, and/or $R^{18}$ are selected from a C2-C30 alkenyl group; and the subscripts a, b, c, d, e, f, g, are zero or positive subject to the following limitations: $2<a+b+c+d+e+f+g<2000$, and $b+d+f>0$.

In one embodiment, the polyorganosiloxane (B) comprises two or more alkenyl groups. In one embodiment, the alkenyl group is a vinyl group. The polyorganosiloxane can be an alkenyl terminated siloxane.

$R^7$, $R^8$, $R^9$, $R^{10}$, $R^{11}$, $R^{12}$, $R^{13}$, $R^{14}$, $R^{16}$, and $R^{17}$ of the polyorganosiloxane (B) are independently chosen from a C1-C30 hydrocarbon or a C6-C30 aromatic group. In one embodiment, $R^7$, $R^8$, $R^9$, $R^{10}$, $R^{11}$, $R^{12}$, $R^{13}$, $R^{14}$, $R^{16}$, and $R^{17}$ are independently chosen from a C1-C30 alkyl, a C2-C20 alkyl, a C3-C15 alkyl a C4-C10 alkyl, or a C6-C8 alkyl. In one embodiment, $R^7$, $R^8$, $R^9$, $R^{10}$, $R^{11}$, $R^{12}$, $R^{13}$, $R^{14}$, $R^{16}$, and $R^{17}$ are independently selected from a C1-C6 alkyl. In one embodiment, $R^7$, $R^8$, $R^9$, $R^{10}$, $R^{11}$, $R^{12}$, $R^{13}$, $R^{14}$, $R^{16}$, and $R^{17}$ are each selected from methyl.

In one embodiment of the polyorganosiloxane (B), $R^7$, $R^8$, $R^9$, $R^{10}$, $R^{11}$, $R^{12}$, $R^{13}$, $R^{14}$, $R^{16}$, and $R^{17}$ are independently chosen from a C1-C30 hydrocarbon, or a C6-C30 aromatic group, where at least one of $R^7$, $R^8$, $R^9$, $R^{10}$, $R^{11}$, $R^{12}$, $R^{13}$, $R^{14}$, $R^{16}$, and $R^{17}$ is selected from a C6-C30 aromatic group.

In one embodiment, at least one of $R^{13}$ and/or $10^4$ is a C6-C30 aromatic group. An exemplary aromatic group is a phenyl group.

In one embodiment, the polyorganosiloxane (B) is an MDM type polymer with terminal alkenyl groups. In one embodiment, the MDM type polymer is a polydimethylsiloxane with two or more terminal alkenyl group. In one embodiment, the MDM type polymer is of the type $MD^HD^{Ph}M$, with two or more terminal alkenyl groups.

In embodiments, $2<a+b+c+d+e+f+g<2000$; $5<a+b+c+d+e+f+g<1750$; $10<a+b+c+d+e+f+g<1500$; $20<a+b+c+d+e+f+g<1250$; $25<a+b+c+d+e+f+g<1000$; $50<a+b+c+d+e+f+g<750$; $75<a+b+c+d+e+f+g<500$; $100<a+b+c+d+e+f+g<400$; or $200<a+b+c+d+e+f+g<300$.

The polyorganosiloxane (B) can be present in an amount of from about 0 parts by mass to about 80 parts, from about 0 parts to about 60 parts, or from about 0 parts to about 50 parts based on the total weight of the curable silicone composition. In one embodiment, the polyorganosiloxane (B) is present in an amount of from about 10 parts by mass to about 50 parts by mass, from about 20 parts to about 45 parts by mass, or from about 30 parts by mass to about 40 parts by mass based on the total weight of the curable composition. In one embodiment, the polyorganosiloxane (B) is present in an amount of from about 20 parts to about 50 parts based on total weight of the curable silicone-imide composition, from about 25 parts to about 45 parts based on total weight of the curable silicone-imide composition, or from about 30 parts to about 40 parts based on total weight of the curable silicone-imide composition.

In one embodiment, polyorganohydrogensiloxane component (C) is chosen from a compound of the formula:

$M^3{}_hM^4{}_iD^3{}_jD^4{}_kT^3{}_mT^4{}_nQ_o$ wherein:

$M^3=R^{19}R^{20}R^{21}SiO_{1/2}$
$M^4=R^{22}R^{23}R^{24}SiO_{1/2}$
$D^3=R^{25}R^{26}SiO_{2/2}$
$D^4=R^{27}R^{28}SiO_{2/2}$
$T^3=R^{29}SiO_{3/2}$
$T^4=R^{30}SiO_{3/2}$
$Q=SiO_{4/2}$ where $R^{19}$, $R^{20}$, $R^{21}$, $R^{25}$, $R^{26}$, and $R^{29}$, and are independently chosen from a C1-C30 hydrocarbon, a C6-C30 aromatic group, or C1-C30 alkoxy group;

$R^{22}$, $R^{23}$, $R^{24}$, $R^{27}$, $R^{28}$, and $R^{30}$ are independently chosen from hydrogen, a C1-C30 hydrocarbon, a C6-C30 aromatic group, C1-C30 alkoxy group, or a C2-C30 alkenyl group, with the proviso that one or more of $R^{22}$, $R^{23}$, $R^{24}$, $R^{27}$, $R^{28}$, and/or $R^{30}$ are hydrogen; and the subscripts h, i, j, k, m, n, o, are zero or positive subject to the following limitations: $1<h+i+j+k+m+n+o<100$, $i+k+n>0$.

In one embodiment, $R^{19}$, $R^{20}$, $R^{21}$, $R^{25}$, $R^{26}$, and $R^{29}$, and any of $R^{22}$, $R^{23}$, $R^{24}$, $R^{27}$, $R^{28}$, and $R^{30}$ that are not hydrogen, are independently chosen from a C1-C30 alkyl, a C2-C20 alkyl, a C3-C15 alkyl a C4-C10 alkyl, or a C6-C8 alkyl. In one embodiment, $R^{19}$, $R^{20}$, $R^{21}$, $R^{25}$, $R^{26}$, and $R^{29}$, and any of $R^{22}$, $R^{23}$, $R^{24}$, $R^{27}$, $R^{28}$, and $R^{30}$ that are not hydrogen, are each methyl.

In one embodiment, the polyorganohydrogensiloxane (C) is of the type $M^HQ_4$ or $MD^HDM$.

In one embodiment, the polyorganohydrogensiloxane (C) is present in an amount of from about 0.05 parts by mass to about 10 parts, from about 0.08 parts to about 6 parts, or from about 1 parts to about 4 parts based on the total weight of the curable composition. In embodiments, a polyorganohydrogensiloxane having at least two hydrogen atoms bonded to silicon atoms in one molecule is provided in an amount such that the hydrogen atoms bonded to silicon atoms is 0.9 to 10 mol, 1.5 to 8 mol, 2.5 to 6 mol, or 3 to 5 mol relative to 1 mol of a total amount of the alkenyl groups contained in the (A) component.

In one embodiment, a hydrosilylation catalyst (D) may be used to promote the reaction of the alkenyl containing compounds with the polyorganohydrogensiloxane. The hydrosilylation catalyst can include precious metal catalysts such as, but not limited to, those which use ruthenium, rhodium, palladium, osmium, iridium, platinum, etc., and complexes of these metals. Examples of suitable hydrosilylation catalysts for use in the present invention include, but are not limited to, Ashby catalysts; Lamoreax catalysts; Karstedt catalysts; Modic catalysts; Jeram catalysts, or a combination of two or more thereof.

The catalyst (D) can be provided in any amount suitable to promote the reaction of the alkenyl containing compounds (e.g., component (A) and/or (B)) with the polyorganohydrogensiloxane (C). In embodiments, the catalyst (D) can be present in an amount of from about 1 part by mass to about 10 parts by mass, from about 2 parts by mass to about 8 parts by mass, or from about 3 parts by mass to about (6) parts by mass based on the total weight of the curable composition.

The additive (E) can be chosen from a number of additives and is selected as desired for a particular purpose or intended application. The additive may be selected to impart certain properties to the cured material formed from the composition, to help in processing the composition, etc. In one embodiment, the additive (E) is selected from a pigment, a lubricant, a viscosity modifier, a heat stabilizer, a photostabilizer, a flame retardant, inhibitors, an adhesion promoter or a combination of two or more thereof.

In one embodiment, the additive (E) is present in an amount of from about 0.05 parts by mass to about 3000 parts, from about 0.5 parts to about 1000 parts, or from about 0.05 parts to about 1 parts based on the total weight of the curable silicone composition.

In one embodiment, the additive is selected from an inhibitor. In one embodiment, the inhibitor is selected from ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, etc. Particularly suitable inhibitors for the compositions are alkynyl alcohols and maleates. Examples of suitable polymerization inhibitors include, but are not limited to, diallyl maleate, hydroquinone, p-methoxyphenol, t-butylcatechol, and phenothiazine.

In one embodiment, the inhibitor is present in an amount of from about 1 parts by mass to about 10 parts, more preferably from about 0.1 parts to about 2 parts, and most preferably from about 0.05 parts to about 1 part based on the total weight of the curable silicone-imide composition.

In one embodiment, the additive (E) is selected from a polymerization inhibitor. The polymerization inhibitor is not particularly limited and may be chosen as desired for a particular purpose or intended use. Examples of suitable inhibitors include, but are not limited to, ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, etc. Particularly suitable inhibitors for the compositions are alkynyl alcohols and maleates. Examples of suitable polymerization inhibitors include, but are not limited to, diallyl maleate, hydroquinone, p-methoxyphenol, t-butylcatechol, phenothiazine, etc.

The amount of inhibitor to be used in the compositions can be any amount that will retard the above reaction at room temperature while not preventing said reaction at moderately elevated temperature. In embodiments, a polymerization inhibitor can be present in an amount of from about 0.05 part by mass to about 10 parts by mass, from about 0.1 parts by mass to about 5 parts by mass, or from about 1 part by mass to about 2 parts by mass.

The curable compositions may also include an antioxidant compound. Examples of suitable classes of antioxidant compounds include, but are not limited to, hindered amines and/or hindered phenol compounds.

Examples of hindered amine antioxidant compounds include, but are not limited to Hindered amine series antioxidant (N,N',N",N'''-tetrakis-(4,6-bis(butyl-(N-methy)-2,2,6,6-tetramethylpiperidin-4-yl)amino)-triazine-2-yl)-4,7-diazadecan-1,10-diamine, a polycondensation product of dibutylamine-1,3,5-triazine-N,N'-bis-(2,2,6,6-tetramethyl-4-piperidyl-1,6-hexamethylenediamine-N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a polymer of dimethyl succinate and 4-hydroxy-2,2,6,6-tetramethyl-1-piperidinethanol, [a reaction product of decanedioic acid bis(2,2,6,6-tetramethyl-1 (octyloxy)-4-piperidyl) ester, 1,1-dimethylethylhydroperoxide and octane] (70%)-polypropylene (30%), bis(1,2,2,6,6-pentamethyl-4-piperidyl)[[3,5-bis(1,1-dimethyl ethyl)-4-hydroxyphenyl]methyl]butylmalonate, methyl 1,2,2,6,6-pentamethyl-4-piperidylsebacate, bis(2,2,6,6-tetramethyl-4-piperidyl)sebacate, bis(1,2,2,6,6-pentamethyl-4-piperidyl) sebacate, 1-[2-[3-(3,5-di-tert-butyl-4-hydroxyphenyl) propionyloxy]ethyl]-4-[3-(3,5-di-tert-butyl-4-hydroxyphenyl)propionyoxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4.5]decan-2,4-dione, etc.).

In one embodiment, the antioxidant compound is a hindered phenolic compound. The hindered phenol can be chosen as desired for a particular purpose or intended application. Examples of suitable hindered phenols include, but are not limited to, monophenols such as 2,6-di-t-butyl-p-cresol, 2-t-butyl-4-methoxyphenol, 3-t-butyl-4-methoxyphenol, and 2,6-t-butyl-4-ethylphenol, bisphenols such as 2,2'-methylene-bis(4-methyl-6-t-butylphenol), 4,4'-thiobis (3-methyl-6-t-butylphenol), and 4,4'-butylidene-bis(3-methyl-6-t-butylphenol); and polymeric phenols such as 1,1,3-tris(2-methyl-4-hydroxy-5-t-butylphenyl)butane, 1,3, 5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, bis[3,3'-bis(4'-hydroxy-3-t-butylphenyl)butyric acid glycol ester, and tocopherol (vitamin E), pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1, 6-diylbis[3-(3,5-di-tert-butyl-4-hydroxyphenylpropioamide), benzenepropanoic acid 3,5-bis (1,1-dimethylethyl)-4-hydroxy C7-C9 side chain alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3",5,5',5"-hexane-tert-butyl-4-a,a',a"-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethyl ene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, a reaction product of N-phenylbenzeneamine and 2,4,4-trimethylpentene, 2,6-di-tert-butyl-4-(4,6-bis(octylthio)-1,3,5-triazine-2-ylamino) phenol etc.).

IRGANOX 1330 is a sterically hindered phenolic antioxidant ("3,3',3',5,5',5'-hexa-tert-butyl-a,a',a"-(mesitylene-2,4,6-triyl)tri-p-cresol") commercially available from BASF. Irganox 1010 is a sterically hindered phenolic antioxidant ("Pentaerythritol Tetrakis(3-(3,5-di-tert-butyl-4-hydroxyphenyl)propionate)") commercially available from BASF, or 1,3,5-trimethyl-2,4,6-tris (3,5-di-tert-butyl-4-hydroxybenzyl) benzene commercially available as ETHANOX™330 (Albemarle Corporation), pentaerythritol tetrakis[3-(3,5-di-tert-butyl-4-hydroxyphenyl)propionate] (Irganox 1010), tris(3,5-di-tert-butyl-4-hydroxybenzyl) isocyanurate (Irganox 3114), tris(3,5-di-tert-butyl-4-hydroxybenzyl) isocyanurate as Irganox 3114.

Antioxidants can be included in the composition in an amount of from about 0 parts by mass to about 10 parts by mass, from about 0 parts by mass to about 5 parts by mass, or from about 0 parts by mass to about 3 parts by mass.

The curable composition may optionally comprise a photostabilizer. The photostabilizer is not particularly limited and may be chosen as desired for a particular application or intended use. Examples of suitable materials for the photostabilizer include, but are not limited to, 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, a reaction product of methyl 3-(3-(2H-benzotriazol-2-yl)-5-tert-butyl-4-hydroxyphenyl) propionate/polyethylene glycol 300, 2-(2H-benzotriazol-2-yl)-6-(straight and branched dodecyl)-4-methylphenol, 2-(4,6-diphenyl-1,3,5-triazine-2-yl)-5-[(hexyl)oxy]-phenol, octabenzone, 2,4-di-tert-butylphenyl-3,5-di-tert-butyl-4-hydroxybenzoate, Tinuvin 622LD, Tinuvin 144, CHIMASSORB 119FL, MARK LA-57, LA-62, LA-67, LA-63, SANDOL LS-765, LS-292, LS-2626, LS-1114, LS-744, etc.

Photostabilizers can be included in the composition in an amount of from about 0 parts by mass to about 10 parts by mass, from about 0 parts by mass to about 5 parts by mass, or from about 0 parts by mass to about 3 parts by mass.

The composition optionally includes a filler (F). In one embodiment, the additive (F) is selected from a filler. Examples of suitable fillers include, but are not limited to, Silica, fumed Silica, $SiO_2$, $TiO_2$, MgO, ZnO, $CaCO_3$, $CeO_2$, $Fe_2O_3$, SiC, clay material, graphene oxide, boron oxide, boron nitride (BN), carbon nanotubes, zirconium oxide, Fly Ash, $Zr(OEt)_4$, $Ti(OEt)_4$, powder form of any polyimide, polybenzimidazole, polyamideimide, poly BPA sulfone, Siloxane-polyimide, Siloxane-benzimidazole, Siloxane-polysulfones or any other heat stable filler.

In one embodiment, the filler is present in an amount of from about 0 parts by mass to about 3000 parts, more preferably from about 15 parts to about 2000 parts, and most preferably from about 25 parts to about 30 parts based on the total weight of the curable silicone composition.

In one embodiment, the filler is present in an amount from about 20 parts by mass to about 30 parts based on the total weight of the curable silicone composition.

The cured silicone-imide material formed from the composition can have a thermal degradation of 300° C. to 600° C., about 350° C. to about 550° C., or from about 400° C. to about 500° C. Thermal degradation, which may also be referred to as thermal decomposition, can be measured by thermogravimetric analysis (TGA). In one embodiment, thermal degradation can be measured using a TA TGA Q5000. Thermal degradation can be evaluated in a nitrogen or air atmosphere with a heating rate of 10° C./minute up to 1000° C.

The curable compositions may be cured by providing a mixture of the respective components and exposing the mixture to a sufficient temperature for a sufficient time to cure the composition. The respective components may be added separately or as two or more packages of materials where a package includes two or more of the components required for the final composition. Curing may be accomplished under exposure to an elevated temperature for a period of from about 15 minutes to about 120 minutes. In embodiments, curing can be accomplished at 100° C. in 60 minutes.

In one embodiment, the silicone-imide composition can be coated or adhered on a substrate. The composition can be applied in any suitable manner including, but not limited to, brushing, spraying, curtain coating, dipping, spin coating, etc.

The substrate can be chosen from a plastic material, ceramic, glass, rubber material, filled metal, metal alloys, metallized plastic, and/or coated or painted metal. Examples of suitable plastics include, but are not limited to, synthetic organic polymeric materials, such as acrylic polymers, for example, poly(methylmethacrylate), and the like; polyesters, for example, poly(ethylene terephthalate), poly(butylene terephthalate), and the like; polyamides, polyimides, acrylonitrile-styrene copolymer, styrene-acrylonitrile-butadiene terpolymers, polyvinyl chloride, polyethylene, and the like, polycarbonates, and copolycarbonates such as EXL, high-heat polycarbonates. In one embodiment, the substrate is formed of polycarbonate or an acrylic resin. Polycarbonates are especially suitable materials for transparent substrates because of their excellent physical, mechanical and chemical properties. In general, the choice of substrate is ultimately determined by the contemplated end use.

In one embodiment a cured silicone-imide material is formed from the curable composition.

The compositions may be used in a variety of applications. In embodiments, the compositions may be cured and used for properties like excellent thermal stability, thermal conductivity, dimensional stability, adhesion, mechanical properties, electrical properties, low temperature flexibility, low dielectric constant, thermo-oxidative stability, hydrophobicity, chemical resistance, biocompatibility, flame retardancy and gas permeability and are mainly used in the aerospace, electronics, automobiles, insulations, coatings, solvent resistant membranes applications etc.

The following examples are intended to illustrate aspects and embodiments of the present technology. All parts and percentages are by weight and all temperatures are in Celsius unless explicitly stated otherwise. All patents, other publications, and U.S. patent applications referred to in the instant application are incorporated herein by reference in their entireties.

Examples

Synthesis of N-Allylamide of Pyromellitic Dianhydride (1): Pyromellitic dianhydride (50 g, 0.2292 mol) and Acetic Acid (250 ml) were taken in a 3-necked round bottom flask (Condenser/Overhead Stirrer/Dropping Funnel) followed by addition of Allylamine (28 g, 0.504 mol) drop wise at ice cold condition. Once addition completes, applied heat started from 40° C. to 130° C. till the reaction mixture becomes clear solution. There was a change in the color over a period. Once the solution is clear, applied heat at 130° C. for 4 hours to form the ring. In another round bottom flask, 250 ml of water was taken and heated at −100° C. Then the reaction mixture was poured into the water slowly and it formed solid material. The solid material was filtered off using funnel with paper. Solid material was washed with water and methanol and dried using high vacuum pump. Yield=65 g (95%). Material was characterized with 1H-NMR and it perfectly matched with desired structure.

Synthesis of ABn Siloxane-Polyimide Copolymer: Solid N-Allylpyromelliticdiimide material (1) (15 g, 0.050 mol) was dissolved in 350 ml Toluene and heated up to 75° C. Once the temperature reached at 75 C, Pt catalyst (10 ppm) was added followed by drop wise addition of silicone hydride (76.53 g). Slight exothermicity (−3° C.) was observed. Once the addition was over, reaction was running for another 4 hours, and completion of product formation was monitored by 1H-NMR. Once the reaction was over, activated charcoal and silica gel mix was added to quench the reaction. Solute was collected through filtration and distilled off the solvent to get viscous material (viscosity=79 Pas). Characterized by 1H-NMR and GPC.

Preparation of Cured Sample and Measurement of Thermal Stability by TGA: Alkene terminated base polymer material was taken in a container followed by mixing with inhibitor and Pt catalyst. The Si—H based crosslinker was then added to the mixture and mixed it very well manually as well as using speed mixer. The whole mixture was then poured into a Teflon mold with specific dimension and thickness. After degasification, the mold was placed in the oven (100° C.) for 1 h for full curing.

Thermal degradation was investigated by using the TGA instrument TA TGA Q5000 in a nitrogen or air atmosphere with a heating rate of 10° C./min until the temperature reaches 1000° C.

Compositions were prepared according to the examples listed in Tables 1 and 2. The compositions were prepared by mixing the alkenyl functional siloxane-imide copolymer material with inhibitor and catalyst in a container. The crosslinker was then added to the mixture and mixed well manually as well as by using speed mixer.

The alkenyl functional siloxane-imide copolymer is an Allyl terminated ABn Siloxane-polyimide copolymer falling under formula (I) synthesized from N-allyl pyromellitic imide and $M^H D_m M^H$ chain extender In the siloxane-imide copolymer employed in the examples, m is 1-200 and n is 1-30.

The compositions were poured into a Teflon mold having dimensions of 145 mm²×0.15 mm. After degasification, the mold was placed in the oven and heated to 100° C. for 1 hour for full curing.

Heat stability: Thermal degradation was investigated by using the TGA instrument TA TGA Q5000 in a nitrogen or air atmosphere with a heating rate of 10° C./min until the temperature reaches 1000° C. $T_0$ represents onset degradation, and $T_d$ represents decomposition peak.

TABLE 1

| | | | Weight % | | | |
|---|---|---|---|---|---|---|
| | | | 1 | 2 | 3 | 4 |
| Siloxane-Imide polymer | A-1 | Imide-Siloxane-Imide ABn | 92.1 | 65.89 | 45.51 | 33.36 |
| Vinyl Polymer | B-1 | $M^{Vi}D_{400}M^{Vi}$ | | | | |
| | B-2 | $M^{Vi}D_{300}D_{20}^{Ph}M^{Vi}$ | | | 45.51 | 33.36 |
| Si-H Cross Linker | C-1 | $M^HQ_4$/ $MD_{23}^HD_{16}M$ | 2.54 | 1.81 | 3.31 | 2.42 |
| Catalyst | D-1 | Karstedt's Catalyst (10 ppm) in Vinyl Polymer | 5.26 | 3.76 | 5.56 | 4.07 |
| Filler | F-1 | Red Iron Oxide (Fe2O3) | | 28.43 | | 26.69 |
| Inhibitor | E-1 | Diallyl Maleate (1000 ppm) | 0.1 | 0.17 | 0.1 | 0.07 |
| | | Total | 100 | 100 | 100 | 100 |
| Heat stability | | TGA $T_0$ (° C.) in air | 324 | 350 | 340 | 431 |
| | | TGA $T_0$ (°o.) in Nitrogen | 428 | 449 | 458 | 446 |
| | | TGA $T_d$ (°o.) in air | 482 | 483 | 494 | 504 |
| | | TGA $T_d$ (°o.) in Nitrogen | 489 | 506 | 505 | 511 |

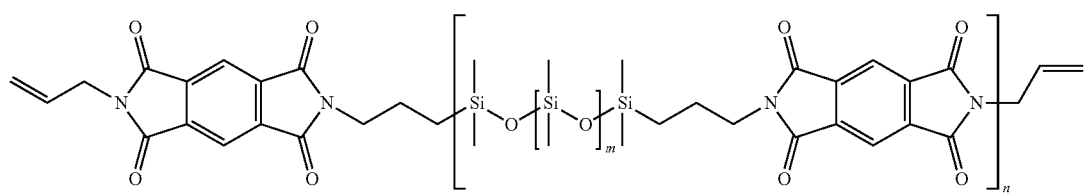

(Formula I)

TABLE 2

| | | | Weight % | | | |
|---|---|---|---|---|---|---|
| | | Comparative Examples | C1 | C2 | C3 | C4 |
| Siloxane-Imide polymer | A-1 | Imide-Siloxane-Imide ABn | | | | |
| Vinyl Polymer | B-1 | $M^{Vi}D_{400}M^{Vi}$ | 92.52 | 67.53 | | |
| | B-2 | $M^{Vi}D_{300}D_{20}{}^{Ph}M^{Vi}$ | | | 91.64 | 67.06 |
| Si-H Cross Linker | C-1 | $M^{H}Q_4/MD_{23}{}^{H}D_{16}M$ | 2.12 | 1.55 | 2.66 | 1.94 |
| Catalyst | D-1 | Karstedt's Catalyst (10 ppm) in Vi-PDMS | 5.25 | 3.83 | 5.59 | 4.09 |
| Filler | F-1 | Red Iron Oxide (Fe2O3) | | 27.01 | | 26.82 |
| Inhibitor | E-1 | Diallyl Maleate 1000 ppm | 0.09 | 0.06 | 0.09 | 0.06 |
| | | Total | 100 | 100 | 100 | 100 |
| Heat Stability | | TGA $T_0$ (°o.) in air | 371 | 428 | 394 | 446 |
| | | TGA $T_0$ (°o.) in Nitrogen | 379 | 426 | 396 | 447 |
| | | TGA $T_d$ (°o.) In air | 389 | 475 | 432 | 481 |
| | | TGA $T_d$ (°o.) In nitrogen | 410 | 489 | 431 | 494 |

As illustrated in the Table 1 and Table 2, the present compositions comprising siloxane-imide copolymer provide good heat stability compared to the use of either the vinyl PDMS or the phenyl PDMS containing compositions alone.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of an aromatic-containing silicone compound and curable compositions comprising such compounds. Modifications may occur to those skilled in the art and to those who may make and use the invention. The disclosed embodiments are merely for illustrative purposes and not intended to limit the scope of the invention or the subject matter set forth in the claims.

What is claimed is:

1. An addition curable silicone-imide composition comprising:
   (A) an alkenyl functional siloxane-imide copolymer selected from a compound of the formula (I):

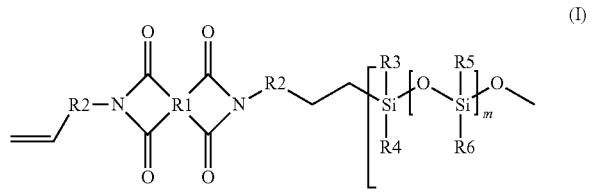

$R^1$ is independently selected from a C5-C20 aryl, a polycyclic aryl group comprising two or more C5-C20 aryl groups, where $R^1$ can be unsubstituted or substituted with a C1-C6 alkyl, a halogen, a haloalkyl, a hydroxy, and/or a C1-C5 alkoxy groups;

$R^2$ is independently selected from a C1-C20 divalent hydrocarbon, a C4-C20 branched divalent hydrocarbon, or a C4-C30 cyclic containing hydrocarbon group;

$R^3$, $R^4$, $R^5$, and $R^6$ are each independently selected from a C1-C10 alkyl and a C6-C20 aryl;

m is an integer from 1 to about 200; and n is an integer from 1 to about 30; the alkenyl functional siloxane-imide copolymer being present in the composition in an amount of from about 20 to about 50 parts by mass based on the total weight of the curable silicone composition;

(B) from about 20 parts to about 50 parts by mass of an alkenyl functional organosiloxane based on the total weight of the curable silicone composition;

(C) a polyorganohydrogensiloxane having at least two hydrogen atoms bonded to silicon atoms;

(D) a catalyst selected from precious metal catalysts selected from ruthenium, rhodium, palladium, osmium, iridium, and platinum, and complexes comprising one or more of such metals;

(E) an additive; and (F) 0 parts by mass to about 3000 parts of a filler based on the total weight of the curable silicone composition.

2. The addition curable composition of claim 1, wherein $R^1$ is independently selected from benzene, naphthalene, benzophenone, biphenyl, a biphenyl alkane, biphenylether, isopropylidinediphenylphenoxy, biphenyl sulfone, biphenyl sulfide, norbornyl, or hexafluoromethylbiphenyl.

3. The addition curable composition of claim 1, wherein $R^1$ is benzene.

4. The addition curable composition of claim 1, comprising the alkenyl functional siloxane-imide copolymer (A) in an amount of from about 10 parts by mass to about 100 parts based on total weight of the curable silicone-imide composition.

5. The addition curable composition of claim 1, comprising the alkenyl functional siloxane-imide copolymer (A) in an amount of from about 30 parts to about 95 parts based on total weight of the curable silicone-imide composition.

6. The curable composition of claim 1, comprising the alkenyl functional organosiloxane (B) which is selected from a compound of the formula $M^1_a M^2_b D^1_c D^2_d T^1_e T^2_f Q_g$ wherein:

$M^1 = R^7 R^8 R^9 SiO_{1/2}$
$M_2 = R_{10} R_{11} R_{12} SiO_{1/2}$
$D^1 = R^{13} R_{14} SiO_{2/2}$
$D^2 = R^{15} R^{16} SiO_{2/2}$
$T^1 = R^{17} SiO_{3/2}$
$T^2 = R^{18} SiO_{3/2}$
$Q = SiO_{4/2}$ where $R^7$, $R^8$, $R^9$, $R^{11}$, $R^{12}$, $R^{13}$, $R_{14}$, $R_{16}$, and $R^{17}$ are independently chosen from a C1-C30 hydrocarbon, or a C6-C30 aromatic group;

$R^{10}$, $R^{15}$, and $R^{18}$ are independently chosen from a C1-C30 hydrocarbon, a C6-C30 aromatic group, C1-C30 alkoxy group, or a C2-C30 alkenyl group, with the proviso that one or more of $R^{10}$, $R^{15}$, and/or $R^{18}$ are selected from a C2-C30 alkenyl group;

the subscripts a, b, c, d, e, f, g, are zero or positive subject to the following limitations: $2<a+b+c+d+e+f+g<2000$, and $b+d+f>0$.

7. The curable composition of claim 6, wherein $R^7$, $R^8$, $R^9$, $R^{11}$, $R^{12}$, $R^{13}$, $R^{14}$, $R^{16}$, and $R^{17}$ are independently chosen from a C1-C30 hydrocarbon, or a C6-C30 aromatic group, where at least one of $R^7$, $R^8$, $R^9$, $R^{11}$, $R^{12}$, $R^{13}$, $R^{14}$, $R^{16}$, and $R^{17}$ is selected from a C6-C30 aromatic group.

8. The curable composition of claim 7, wherein at least one of $R^{13}$ and/or $R^{14}$ is a C6-C30 aromatic group.

9. The curable composition of claim 8, wherein $R^{13}$ and/or $R^{14}$ are a phenyl group.

10. The curable composition of claim 1, comprising the alkenyl functional organosiloxane (B) in an amount of from about 10 parts by mass to about 50 parts based on the total weight of the curable silicone composition.

11. The curable composition of claim 1, wherein the alkenyl functional siloxane-imide copolymer (A) is present in an amount of from about 30 parts to about 40 parts by mass based on total weight of the curable silicone-imide composition, and the alkenyl functional organosiloxane (B) is present in an amount of 30 parts to about 40 parts by mass based on total weight of the curable silicone-imide composition.

12. The curable composition of claim 1, wherein the polyorganohydrogensiloxane (C) is chosen from a compound of the formula:

$M^3_h M^4_i D^3_j D^4_k T^3_m T^4_n Q_o$ wherein:
$M^3 = R^{19} R^{20} R^{21} SiO_{1/2}$
$M^4 = R^{22} R^{23} R^{24} SiO_{1/2}$
$D^3 = R^{25} R^{26} SiO_{2/2}$
$D^4 = R^{27} R^{28} SiO_{2/2}$
$T^3 = R^{29} SiO_{3/2}$
$T^4 = R^{30} SiO_{3/2}$
$Q = SiO_{4/2}$ where $R^{19}$, $R^{20}$, $R^{21}$, $R^{25}$, $R^{26}$, and $R^{29}$, and are independently chosen from a C1-C30 hydrocarbon, a C6-C30 aromatic group, or C1-C30 alkoxy group;

$R^{22}$, $R^{23}$, $R^{24}$, $R^{27}$, $R^{28}$, and $R^{30}$ are independently chosen from hydrogen, a C1-C30 hydrocarbon, a C6-C30 aromatic group, C1-C30 alkoxy group, or a C2-C30 alkenyl group, with the proviso that one or more of $R^{22}$, $R^{23}$, $R^{24}$, $R^{27}$, $R^{28}$, and/or $R^{30}$ are hydrogen;

the subscripts h, i, j, k, m, n, o, are zero or positive subject to the following limitations: $1<h+i+j+k+m+n+o<100$, $i+k+n>0$.

13. The curable composition of claim 1, comprising the polyorganohydrogensiloxane (C) in an amount of from about 0.05 parts by mass to about 10 parts based on the total weight of the curable composition.

14. The curable composition of claim 1, wherein the catalyst (D) is present in an amount of from about 1 parts by mass to about 10 parts based on the total weight of the curable silicone composition.

15. The curable composition of claim 1, wherein the additive (E) is selected from at least one of a pigment, a lubricant, a viscosity modifier, a heat stabilizer, a photostabilizer, a flame retardant, an inhibitor, an adhesion promoter, or combinations of two or more thereof.

16. The curable composition of claim 1, comprising the additive (E) in an amount of from about 0.05 parts by mass to about 3000 parts based on the total weight of the curable silicone composition.

17. The curable composition of claim 15, wherein the additive is an inhibitor.

18. The curable composition of claim 17, wherein the inhibitor is selected from an ethylenically unsaturated amide, aromatically unsaturated amide, an acetylenic compound, an ethylenically unsaturated isocyanate, an olefinic siloxane, an unsaturated hydrocarbon diester, an unsaturated hydrocarbon mono-ester of unsaturated acid, a conjugated or isolated ene-yne, a hydroperoxide, a ketone, a sulfoxide, an amine, a phosphine, a phosphite, a nitrite, a diaziridine, or a combination of two or more thereof.

19. The curable composition of claim 17, wherein the inhibitor is selected from an alkynyl alcohol, a maleate, or a combination thereof.

20. The curable composition of claim 17, wherein the inhibitor is selected from diallyl maleate, hydroquinone, p-methoxyphenol, t-butylcatechol, phenothiazine, or a combination of two or more thereof.

21. The curable composition of claim 17, comprising the inhibitor in an amount of from about 0.05 parts by mass to about 10 parts based on the total weight of the curable silicone-imide composition.

22. The curable composition of claim 17, comprising the inhibitor in an amount of from about 0.05 parts by mass to about 2 parts based on the total weight of the curable silicone-imide composition.

23. The curable composition of claim 1, wherein the filler (F) is selected from $SiO_2$, $TiO_2$, MgO, ZnO, $CaCO_3$, $CeO_2$, $Fe_2O_3$, SiC, Clay Material, Graphene Oxide, Boron Oxide, BN, Carbon Nano Tube, Zirconium Oxide, Fly Ash, $Zr(OEt)_4$, $Ti(OEt)_4$, a powder form of any Polyimide, Polybenzimidazole, Polyamideimide, Poly BPA Sulfone, Siloxane-Polyimide, Siloxane-Benzimidazole, Siloxane-Polysulfones, a combination of two or more thereof.

24. The curable composition of claim 22, wherein the filler (F) is $Fe_2O_3$.

25. The curable composition of claim 1, wherein the filler (F) is present in an amount of from about 0 parts by mass to about 100 parts based on the total weight of the curable silicone composition.

26. The curable composition of claim 22, wherein the filler (F) is present in an amount of from about 20 parts by mass to about 30 parts based on the total weight of the curable silicone composition.

27. A process of preparing a cured silicone-imide material comprising contacting the composition of claim 1 with a curing condition.

28. The process as claimed in claim 27 where the curing condition is the curing catalyst.

29. A cured silicone-imide material formed from the composition of claim 1.

30. The cured silicone-imide material of claim 28 having a thermal degradation of 300° C. to 600° C. as measured by thermogravimetric analysis at a heating rate of 10° C./min until the temperature reaches 1000° C.

31. The cured material of claim 28, wherein the cured silicone-imide material is employed on or as part of an article in an aerospace device, an electronic device, an electronic component, an automobile, insulation, a coating, or a solvent resistant membrane.

32. An article comprising a substrate, wherein the substrate comprises the silicone-imide composition of claim 1 disposed on a surface thereof.

33. The article of claim 31, wherein the substrate comprises a material selected from a plastic material, a ceramic, a glass, a rubber material, a filled metal, a metal alloy, a metallized plastic, a coated or painted metal, or a combination of two or more thereof.

34. The article of claim 32, wherein the substrate material is selected from an acrylic polymer, a polyester, a polyamide, a polyimide, an acrylonitrile-styrene copolymer, a styrene-acrylonitrile-butadiene terpolymer, polyvinyl chloride, polyethylene, polycarbonate, a copolycarbonate, or a combination of two or more thereof.

35. The composition of claim 1, wherein the composition is free of a solvent.

* * * * *